INVENTORS
Leonard C. Moore
Patrick J. Kenneally
BY
ATTORNEY.

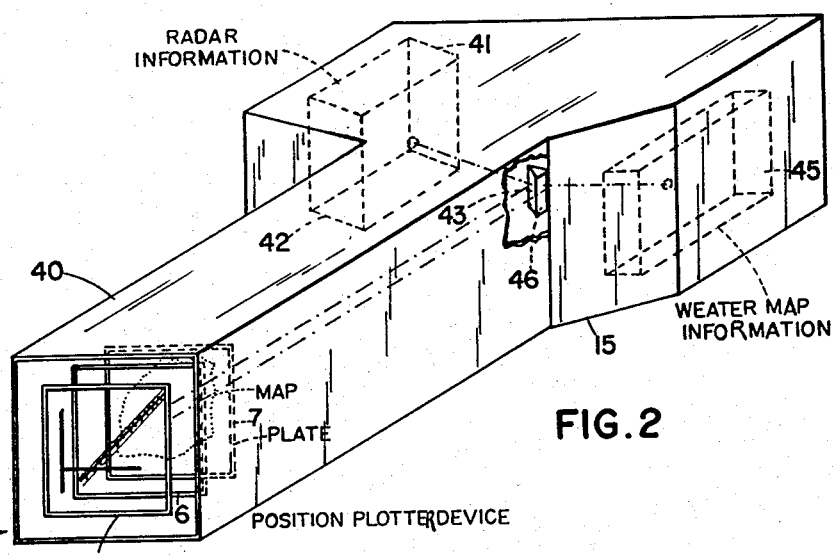
FIG.2
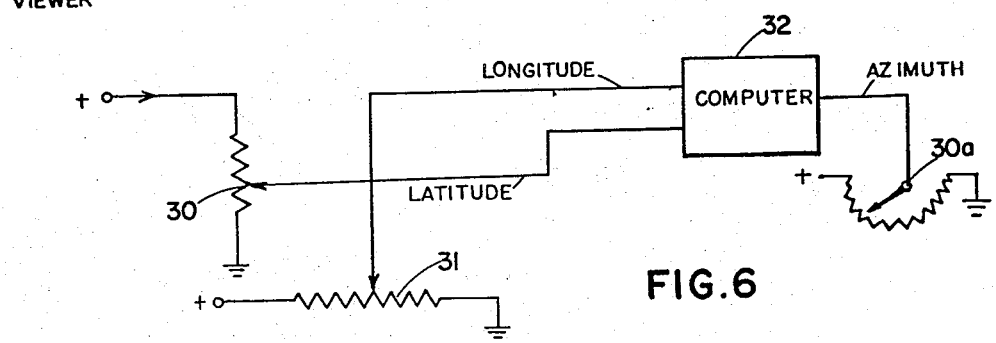
FIG.6
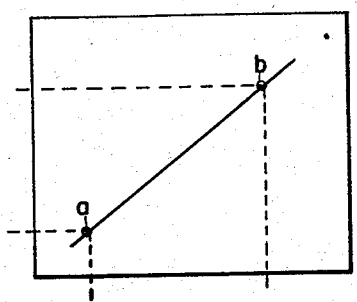
FIG.6A
INVENTORS
Leonard C. Moore
Patrick J. Kenneally
BY 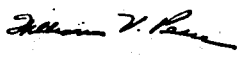
ATTORNEY.

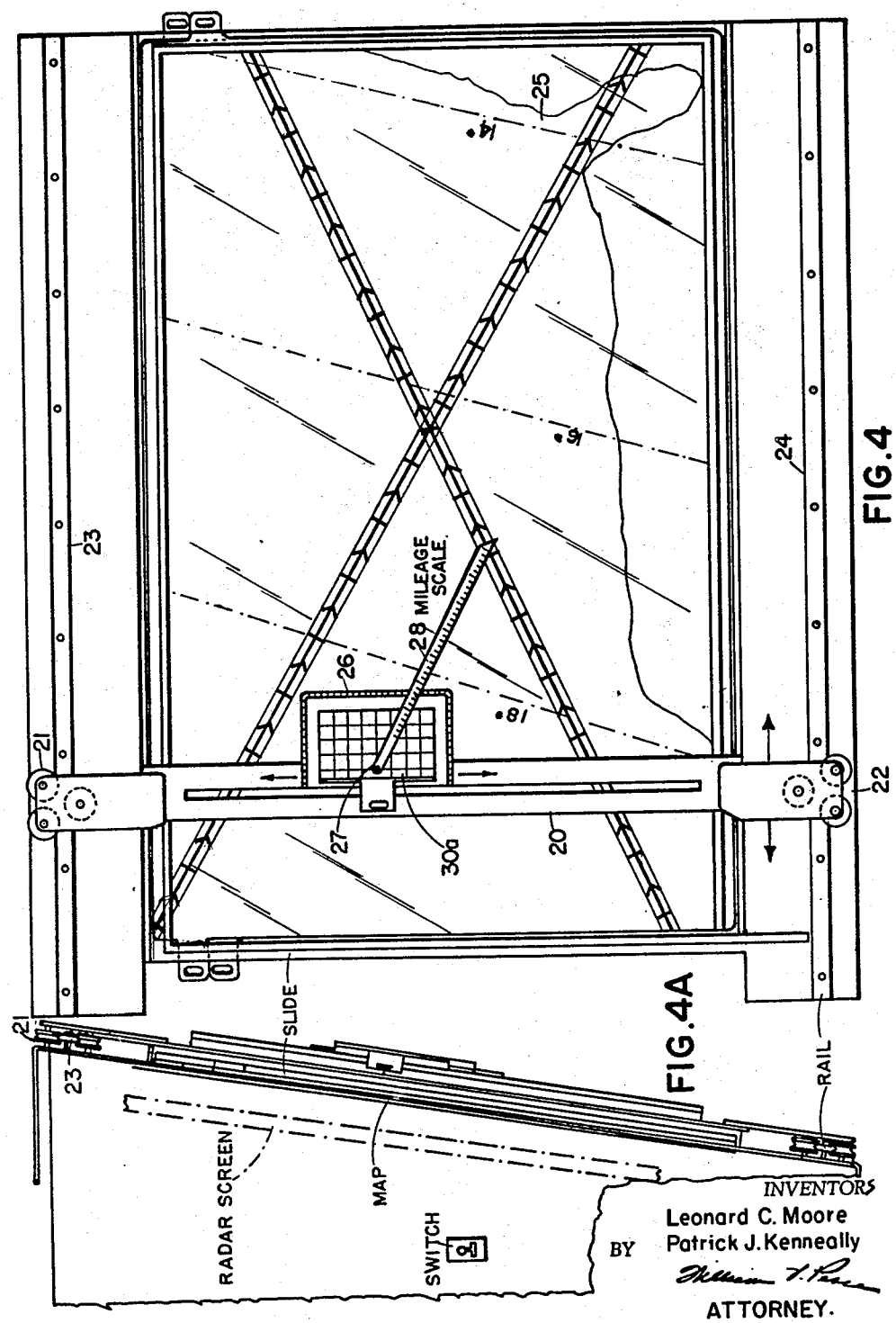

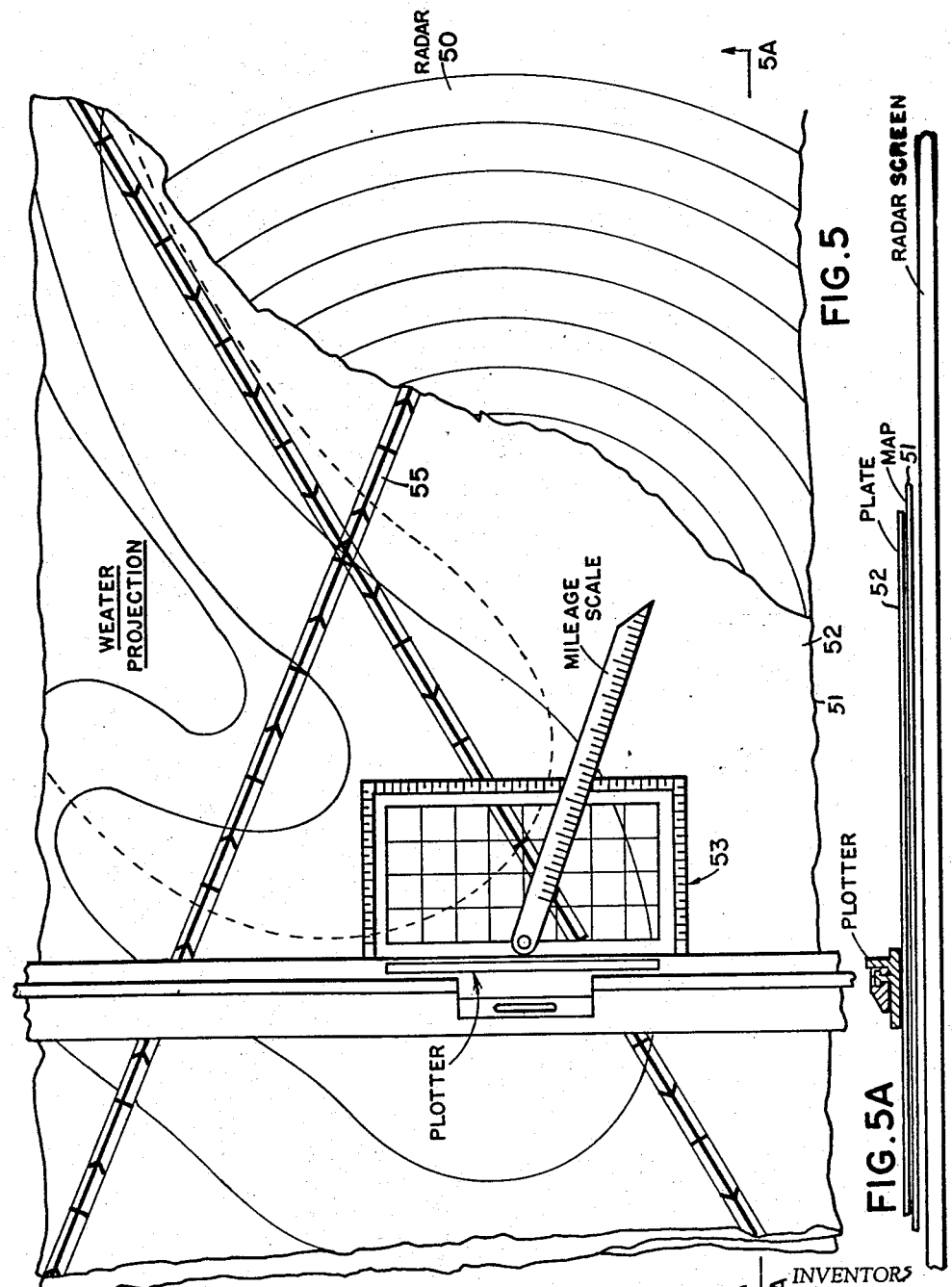

3,178,704
AIR TRAFFIC CONTROL SYSTEM
Leonard Curtis Moore, Somers Point, N.J., and Patrick Joseph Kenneally, Valley Lane, N.Y., assignors to International ATC Systems Corporation, New York, N.Y., a corporation of New York
Filed Aug. 30, 1962, Ser. No. 220,462
3 Claims. (Cl. 343—6)

This invention relates to an air traffic control system and is particularly directed to an air traffic control system in which three dimensional visual observation and control of moving aircraft vehicles may be effected.

The primary function of an air traffic control system is to produce, transmit, receive, condition and display aircraft movement data which is used by the system (includes controller) to provide instructions to pilots which will insure proper and safe spacing of aircraft. The form in which the aircraft movement data is displayed, determines the amount and kind of human effort required to optimize the system's use. This in turn, measures system effectiveness and establishes standards required of its operators. Because the air traffic control display is the end component of the system and what is displayed is the end product, system effectiveness can be measured and established by how well the display depicts aircraft closure situations and environmental conditions.

The present air traffic control system consists of devices configured to produce an irrational non-contextual arrangement of uncorrelated data. It is a responsibility of the controller to learn to use these devices and data to mentally construct abstract pictures of varying numbers of rotor and fixed wing aircraft, each with different performance characteristics; flying or holding in a three-dimensional environment whose degree of utility varies directly with (a) the changing state of the atmosphere, (b) the degree of accuracy with which ground tracks are flown visually, (c) the degree of navigational capability, servicability, and utility, (d) the degree with which pilots and controllers observe the provisions of a highly complex and voluminous structure of laws, regulations and procedures. This mental accomplishment on the part of the controller is possible but to a questionable degree by his having had some 24–36 months of repetitive experience in visualizing aircraft closure profiles.

The nature of the present air traffic control system requires air movements to be channelized over a few of the established airways or routes because: (a) the radar video map would be excessively cluttered with map information thereby obscuring many aircraft radar tagets, (b) it is beyond the capability of man to visualize all of the various routes and airways available for aircraft to use. Aircraft are, therefore, spaced with reference to the airway route structure; or with reference to a few familiar randomly situated geographical points within the area.

The controller must take into account the various routes and courses being flown, compute mentally and apply to the problem the various ground speeds being made by the aircraft involved and solve aircraft closure problems by guesseing whether adequate separation between aircraft is presently established and whether it will continue to exist. Further the air traffic control display does not show flight direction. The posted data on a given tablet states that (1) the aircraft is proceeding, e.g., from Detroit to St. Louis, or (2) the aircraft is proceeding over Victor Airway 1234 from Omaha to El Paso, or (3) between geographical coordinates, and (4) combinations of 1–2–3. In each case, the controller must visualize the direction between Detroit and St. Louis or the direction, including the turns, Victor Airway 1234 makes between between Omaha and El Paso. The controller is completely lost when he tries to visualize the direction between two or more sets of coordinates. If 20 to 30 movements are added to the environment, each proceeding along routes of the pilots choosing, at random speeds, altitudes and times, some via airways, some on point to point courses and some from coordinate to coordinate, we get some feel for what the controller is up against when he tries to determine aircraft closure situations.

The tabular display depends upon pilot established positions for display updating purposes. These can be, and frequently are, very inaccurate and are readily usable only when they are made over a fix for which a posting is carried on the display. The same holds true for radar positions if they are to be used for tabular display updating purposes. Communication channels have become so badly congested that pilots frequently find it impossible to get their position report to the controller. There is no effective method employed for integrating the tabular and radar displays nor for transferring control jurisdiction from one to the other. There is but one method, and ineffective, for associating weather and other environmental conditions with air movements, and that is through the controller's mind. The controller cannot view his tabular display and learn about closure situations. He must read bits of data from various sources and mentally correlate and screen it, questioning its validity and finally concluding, rightly or wrongly, that adequate separation between aircraft does or does not exist. Because of sequencing actions, the data of any particular flight is seldom found at the same location with reference to the board. In most cases, the controller must search for each data strip as the need arises. Further, there is no means for determining aircraft position in relation to geography or to each other for any given moment. A supplemental radar system can be used if available, but it will only show the relationship of aircraft to the radar station or to familiar points on the video map.

The nature of the tabular display and the frequency of air movements through the area dictate that the control area be divided geographically into sectors of varying dimensions. The ever increasing speeds made by modern aircraft have long since made obsolete this concept, because aircraft enter and exit a sector area so much faster than the system, which includes the controller, can post and correlate the data or, in the case of automatic posting, for a controller to visualize the situation in time to take any necessary control action.

To overcome the limitations resulting from a tabular display and the mental interpretation thereof by a human being called the controller, it is the purpose of this invention to provide a visual display three-dimensional system which does away with the tabular display system, as heretofore practiced, and the mental storage of information displayed thereon.

In the broadest sense the invention herein contemplates the utilization of special type computers which receive pertinent data of each flight such as the route, altitude, true air speed, destination and stores this information and later transfers same or reads it out in the form of a solution to the flight problem over the area controlled onto a transparent tape in the form of vectors, with time increments equally spaced to show the distance the aircraft will travel during these time increments at the particular speeds indicated. The tapes are designed to cover a particular flight area and are placed upon a transparent plate representing the particular flight area in a direction according to the path of flight by the particular aircraft and at its altitude. The particular plates are coded so as to match the computer stored information relative to the particular flight under consideration, there being no mistake that the plate and tape information are the proper ones for identifying the particular flight. Also stored within the computer are environmental conditions in the area under consideration which tend to help or hinder the forward progress of the flight. This information is computed so that the true flight path and tapes corresponding thereto will be furnished and placed on the plates. The plates bearing vector information relative to a given particular flight are each slotted into a console, each slotted portion being given a designated altitude, where each of the plates corresponds to the same flight area and are in complete registry with one another. Any conflicts in flight paths will be readily observable from a study of the plates for each time increment. If the tapes are crossing each other at a common point on the same area, a conflict will result if the time increments on each tape coincide, unless separation is effected. Hence conflicts may be readily discernible with the three-dimensional system.

The vertical and horizontal relationships of aircraft in flight create ever changing patterns of intricate geometrical design, and the common denominator of each design is time. By expressing the position of aircraft in space in terms of time, we are able, with the three-dimensional system, to display the present and predicted horizontal relationship of all aircraft in the environment as to geography, for each increment of time and by appropriately arranging the display, we obtain their vertical relationship.

It is, therefore, one of the principal objects of the invention to provide a new and improved air traffic control system.

Another object of the invention is in providing an operational controller a visual and dynamic presentation of the actual and computed present and future positions and relationships (vertical and horizontal) of aircraft moving or holding in a given environment so as to: (a) greatly enhance air safety, (b) greatly increase his capability of handling increased numbers of flights which results through (c) eliminating the necessity for him to mentally visualize abstract pictures of varying numbers of rotor and fixed wing aircraft flying randomly in limited areas whose degree of usefulness is determined largely by the changing state of the atmosphere.

Another object of the invention is in providing an operational controller a means for rapid composition of the display to show as required, correlated information of the environmental situations in pictorial, graphic or tabular form, in registration with aircraft radar positional and their computed flight plan information as stored in the computer and displayed on the plates. This includes items such as weather conditions, maps and charts of the area of the terrain features, degree of serviceability of navigational aids, communication stations, landing areas available under normal and emergency situations, etc.

Another object of the invention is to provide an air traffic control system which has display data in the form of an analogue and which is in registration with the map of the flight area, so that effectively the display is read out to the controller, in clear and concise terms such information as angle, rate, time and location of closures on impending conflicts. Also areas in which climbs, descents, turns and holds can be made safely can be clearly shown.

Another object of the invention is to provide an air traffic control system which eliminates the necessity for posting and displaying flight data in tabular and stacked array form.

Another object of the invention is to provide an air traffic control system that facilitates air-sea rescue operations by correlating aircraft and steamship position and course information, and, by so directing each, bring about an interception at the earliest moment.

Another object of the invention is to provide an air traffic control system that permits all of the earth's navigable airspace to be controlled.

Another object of the invention is to provide an air traffic control system that permits aircraft to be controlled while flying the "least time track," the path requiring the least amount of flying time.

Another object of the invention is in providing an air traffic control system that permits flight calibration of air navigational aids and systems to take place when used in conjunction with user aircraft.

Another object of the invention is to provide an air traffic control system that permits the controller to establish and issue automatically through the computer to the aircraft for either manual or automatic execution, instructions designed to change altitude and flight direction.

A still further object of the invention is to provide an air traffic control system that permits pilots to interrogate and receive from the ground computer, information regarding other aircraft which might be on conflicting courses.

A still further object of the invention is to provide an air traffic control system that permits pilots and air traffic controllers to use geographical coordinates exclusively to establish aircraft position, departure and arrival points.

Another object of the invention is to provide an air traffic control system that permits the controller to regulate the rate of traffic flow into particular terminal areas or airports on a national or international scale. This will enhance air safety to a marked degree by precluding "oversaturation" of the airspace in limited areas.

Another object of the invention is to provide an air traffic control system that eliminates the use of radar video mapping.

Another object of the invention is to provide an air traffic control system that precludes the assignment of altitudes or courses for pilots to take which would place their aircraft in prohibited or unsafe areas.

And still another object of the invention is to provide an air traffic control system that equips pilots with a pictorial representation of their tracks that are identical with that maintained by the control facility.

Other objects and advantages will become apparent from a reading of the specification when taken with the accompanying drawings and wherein:

FIG. 2 shows diagrammatically and in perspective the viewing console of air traffic in the area under control.

FIGS. 4 and 4a show a single plate and plotter disposed thereon with a pair of computer tapes having a point of intersection or conflict, the plotter arranged to read off latitude and longitude information as well as angles of approach, and etc.

FIG. 5 is similar to FIG. 4 with a section of the plate removed to show a radar screen having aircraft positional information of the particular control area and particularly of the area where the tapes show that a pair of aircraft are in conflict and that the conflict must be resolved.

FIGS. 6 and 6a show the latitude and longitude location plotter in terms of voltages which are disposed to be fed into a computer to update flight information stored in the computer and as shown on the plate for the particular area under control.

Figure 1:
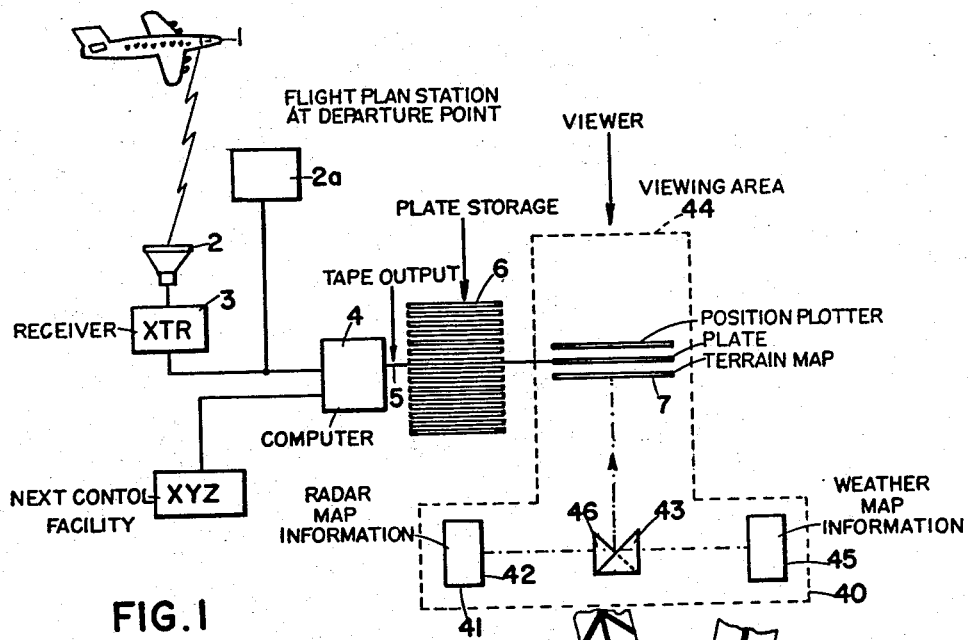
FIG. 1 shows a schematic diagram of the air traffic control system according to the invention.

Now proceeding with FIG. 1 which shows basically the various components of the system, there is shown in general an aircraft 1 in flight over the area under control which transmits flight information via radio, such as ground speed, altitude, direction of flight, wind velocity, atmospheric pressure, and etc., to a receiving station, comprising an antenna 2 and receiver 3. This information is generally transmitted just prior to the entry of the aircraft into the area under control. The flight plan may also be filed in writing with air traffic control prior to departure (2a). The information as received is then transmitted to a computer 4 which is specially programmed to receive such specific information and read out therefrom in the form of printed visible tapes, information in the form of vectors concerning (1) aircraft identification, (2) flight direction, (3) ground speed and (4) the distance remaining within the control area divided into usually five minute time increments expressed in four figure real time. The time increments are spaced to correspond to the distance traveled between succeeding intervals when this distance is indexed with the mileage of the area map under control. The first time increment at the beginning of the tape corresponds to the time the aircraft departs or otherwise comes under control of the facility. The last increment corresponds to the time the aircraft will arrive at destination or pass into the adjacent control area. As the flight progresses, it passes from the jurisdictional area of one control facility to another. In each case, the computer of the facility releasing the flight transmits as commanded by the controller updated flight plan information to the facility XYZ of FIG. 1, next to control the said updated flight plan information where the cycle is again repeated.

Figure 3:
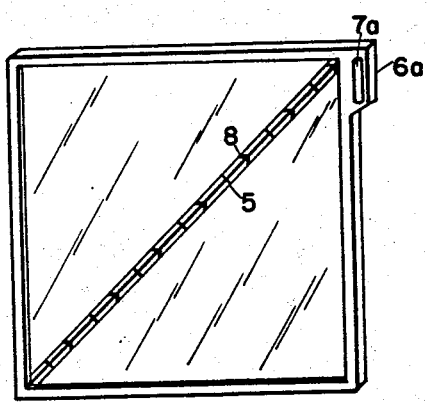
FIGS. 3 and 3a show a single transparent plate and representative computer printed tapes adhered thereto, a tape indicating flight information for a particular aircraft.
Figure 3A:
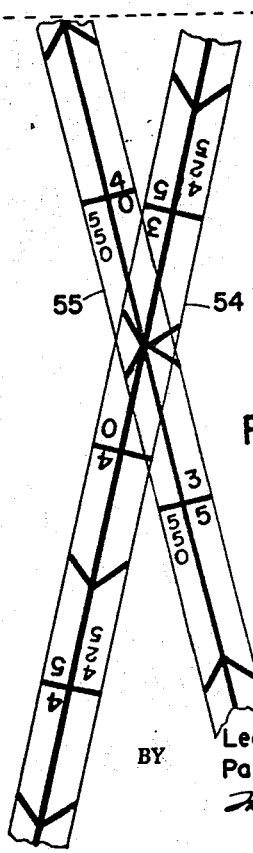

In the present state of the art, there are many computers commercially available that will print the tapes having the desired information above expressed, when appropriately programmed to receive information of a given flight. As a typical type computer the model ASI420 or ASI210 made by the Advanced Scientific Instrument, Inc., may be used to print out in tape form the desired information. A typical printed tape 5 is shown in FIGS. 3 and 3a and adhered to a transparent plate 6 for viewing purposes. The information received by the computer with respect to any given aircraft is first generally stored therein along with information concerning environmental conditions which tend to help or hinder the forward progress of the flight. The desired information is then read or printed out whenever needed. The plate, each of which represents a flight to be controlled and to which the tape is adhered to, is discretely coded for associating flight data as provided by the computer irrespective of the plates position in the system to be subsequently described. The plate, in its blank form, with tape, is coded at one of its edges 6a and placed in registration with a control area map 7. As the coded plate falls into registration, its coded element 7a identifies the plate to the computer and flight plan data such as aircraft identification, point of entry and exit, true airspeed, route and destination, etc., is subsequently fed into the computer. Since the plate bears a coded identification, the computer will associate all appropriate information with the appropriate coded plate. In other words the coded plate and information regarding its flight are locked or married to each other. The computer, when provided with the pertinent flight plan information, will compute and produce the transparent tapes as described before. The tape, as produced by the computer, is then placed on the blank plate 6 beginning at point of origin or when the aircraft enters the system or area under control. As shown in FIG. 3 the tape represents a complete flight plan at a given altitude. The longitudinal line 8 of the tape will bisect each point over which the aircraft will pass and terminate at the point of destination or exit from the system. The tape 5, therefore, becomes a pictorial representation of the flight plan from which the calculated position, in relation to geography, is established.

When two or more plates are brought into registration with each other, the time increments on the tape of each plate will establish the horizontal positions of all aircraft, while plates placed in a slotted console arrangement, to be presently described, will establish their altitude or vertical reationships.

The viewing console 15, shown in FIG. 2, is merely a pictorial representation, for illustration purposes, of what a console may be like, other representative viewing arangements may be used for carrying out the invention embodied herein. To study and survey any flight plan, the coded plate 6 is placed in the viewing console in registration with the map 7 representing the particular area of control. From a study of the tape, it can be seen where the aircraft will be relative to the area under control for the duration of the complete time that the aircraft will be in the area. To determine the exact position at any given time a position plotter 16 is placed over and in proximity to the plate 6 which makes possible the determination of the position of the aircraft at any given time in the area under control in time of latitude and longitude.

In FIG. 4 there is shown in more detail the plotter, above referred to, and particularly how it is oriented relative to the plate having the flight tapes disposed thereon according to a given flight plan. The plotter comprises a movable transverse arm 20 having sets of rollers 21 and 22 at the outer extremities and disposed to move along tracks 23 and 24 respectively in a direction for determining positions of longitudes on a map 25 of the area under control. There is further positioned along the plotter transverse arm 20 another coordinate plotter 26 which is free to move longitudinally along arm 20 so as to determine the latitude position of a particular point on the map 25. The pivotal point 27 is the particular spot which defines the longitude and latitude of any aircraft at some given instant of time. There is further positioned at the pivotal point 27, and arm 28 free to rotate along a voltage divider circuit 30a, and the corresponding voltages relative to the angle of the arm measuring in degrees the angular path taken by any aircraft in reaching some particular objective is programmed into the computer for transmission to the aircraft conceived.

The locator or plotter shown in FIG. 4 in effect is used to convert time in relation to speed to position, position in relation to speed to time, distance in relation to speed to time, time in relation to speed to distance, etc. In addition, it may also function as a flight data entry device to the computer as well as programming the computer for automatically directing aircraft azimuthal heading, and climb and descent attitudes. This may be accomplished by having the plotter indicator 20 and 26 each respectively tied to a voltage selective device as shown in FIG. 6 where each of the arms is made to move along a pair of voltage divider circuits 30 and 31 and the corresponding voltages, relative to a particular point on the map, fed into a computer 32. Since the computer is already tied to a fixed flight plan, by virtue of the fact that the coded plate having the flight plan in the form of a tape already adhered thereto, then where such voltages representative of a given point on the map or the angular path an aircraft is to take are delivered to the computer, an output therefrom will be produced in the form of voltages which are converted by the computer to position in latitude and longitude and in degrees. In effect the plotter output is connected to the computer so that the departure, destination and the pivotal points between can be defined in terms of geographical coordinates, also that aircraft may be brought under control that are already airborne by defining their radar position, route, turning point or points and their destination or area exit point to the computer in terms of geographical coordinates. From this information, the computer takes into account environmental conditions and produces an appropriate tape.

Again referring to FIGS. 1 and 2 and particularly to the viewing console 40, there is shown a radar device 41 having a viewing screen 42 whose image is projected via an angled mirror 43 to the viewing area 44, the imaged radar screen surface representing video wise, the area depicted by the map 7 and in complete registry therewith.

In effect the radar completely represents and scans the area under the flight control plan. In a similar manner weather information from weather maps contained in a slide may be projected from a slide-projector 45 via an angled mirror 46 onto the viewing area 44 and in complete registry with the area map, radar screen and coded plate having the flight plan tape adhered thereto. The weather maps show complete weather conditions in the area under control.

FIG. 5 shows a more detailed arrangement of the viewing area and in particular shows the radar screen 50, the weather map 51 and the coded plate 52 along with the plotter 53, all in complete registry relative to each other. In this particular arrangement it can be seen that a pair of plates bearing the same altitude have a pair of aircraft which will be in conflict as observable in FIG. 3a from tapes 54 and 55 each representative of a particular flight plan.

Plates bearing posted data are delivered mechanically or manually to the appropriate altitude slot of the display or viewing console storage system. The controller or operator brings the incoming plate into registration with all other plates occupying a particular altitude slot. By comparison of all such plates, aircraft confliction can easily and immediately be determined. Should a conflict exist, it would be resolved immediately by altitude adjustment of aircraft involved or by transferring the plates to the radar position where radar vectors would be provided. In effect it is possible, when conflict exists, to track the respective aircraft by means of radar to resolve such conflict. However, since we are involved in a conflict at a given altitude, it becomes desirable to effectively cancel or blank out from view on the radar screen all other aircraft not at the particular altitude where the conflict exists. Hence, by transferring the conflicting plates into registration with radar video, certain controls through the use of the plate code would be activated. These controls would immediately program the radar beacon decoder in such a manner as to display only those targets which the plate represents. Where no conflict actually exists then the plates would be returned to the storage section of the viewing console.

Figure 7:
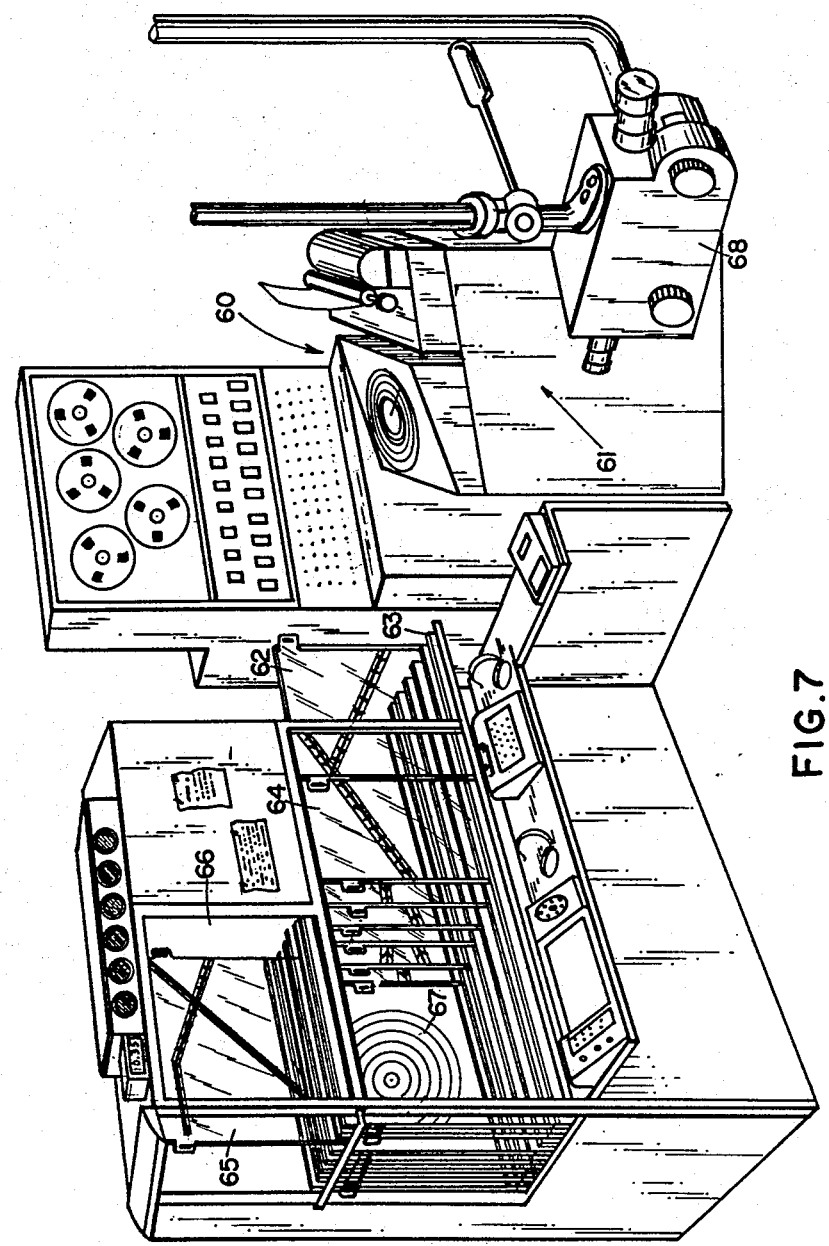
FIG. 7 is a typical air traffic control room showing the various components which go to make up the control system.

Now referring to FIG. 7, there is shown a typical control station for air traffic control in a given locale or area. The respective components shown in FIG. 7 are merely representative, but not all inclusive and various additions and changes can be made without detracting from the inventive concept of a three dimensional system for controlling flight movements of aircraft as embodied in the instant application. In particular, there is shown in the said figure a receiving and transmitting system 60 for receiving pertinent flight information from an aircraft presently in or due to enter into a particular control area. The flight data is then relayed to a computer 61 which receives all of the said information and therefrom prepares and prints in tape form the complete flight path information relative to the particular aircraft during its complete time it remains in the control area. The tapes, representative of the flight are adhered to transparent plates 62, each plate being coded so as to match the computer relative to a particular flight program. When the plate is coded and matched to the computer, there is no likelihood that the information relative to another flight will be transferred to the particular plate in question. In this manner errors in flight programs and path of flight are completely avoided. The coded plates bearing their respective flight tapes are next transferred to slotted positions 63, the said positions being each representative of a particular altitude, and stored in the storage portion 64 of the viewing console. Where a conflict occurs, i.e. when two aircraft will intersect at the same altitude, each conflicting at some particular time, the plates 65 bearing this conflict are transferred to another sector 66 of the console for study and evaluation. The conflict may be resolved from a study of the tapes themselves or by resorting to radar. This is done by transferring the conflicting plates 65 to the radar viewing area 66 when it is placed in registration with the radar screen 67 for the given area under control. As previously stated, the radar has its screen blanked out for all aircraft not at the same altitude of the conflicting aircraft. In this manner confliction will be resolved only for the particular aircraft involved.

Where the number of aircraft conflictions in a given control area occur faster than a single controller can deal with them effectively, situations as represented by the tapes above referred to are transferred to remotely situated radar positions through the use of a high resolution closed circuit television system 68 and mixed in registration with the radar video. Under these conditions proper adjustments and controls are effected to assure conflictions are properly resolved. Hence by referring to the chart of the tape configurations and considering that the time increments on the tape is the position of the aircraft when that time and locale or Greenwich mean time coincides, one can actually observe:

(a) A slower aircraft being overtaken by a faster aircraft;

(b) The time and location where two aircraft will meet (where the time increments on the tape occur at the same point);

(c) Two or more aircraft converging with the time plainly indicated when each will use the same block of airspace;

(d) Aircraft on crossing courses with the computed time each will use the same block of airspace;

(e) How flow control is facilitated on a national or international basis. This may be accomplished by indexing the time on the tape that corresponds to the desired arrival time to the destination. The tape is then connected via the route of flight to departure point. The correct time to release the aircraft is read at departure point. For advanced planning, the estimated position of the aircraft is established for the entire route.

In summary the above and other features of the invention may be postulated as follows:

*Posting flight data for control purposes*

A blank coded plate is placed over and in registration with the map screen. As it reaches registration with the map, its coded element associates the plate with the computer. The controller requests the computer to "read out" stored flight plan inforamtion on the flight being posted. The computer calculates the ground speed the aircraft in question should make and produces a tape in a manner previously described. The tape is placed on the plate by an assistant controller. The time increment on the tape that corresponds to the time the aircraft enters the system is indexed with the geographical point at where the aircraft enters the system. The tape is extended with its longitudinal line bisecting each point over which the aircraft will pass to destination or where the aircraft passes from the system. The tape, therefore, becomes a pictorial representation of the flight path from which the calculated position, in relation to geography, is established. When two or more plates bearing flight data in this form are brought into registration with each other, the corresponding time increments on each of the tapes establishes aircraft relationships. If the plates are brought into registration with the map, the geographical positions of the aircraft are established for each corresponding time increment. By placing the plates in their appropriate altitude slots in the viewing console, their vertical relationship is established.

*Transfer of control*

Transfer of control of aircraft between facilities is a very difficult problem with the conventional system. International has solved the problem by simply defining the position of the radar target of the aircraft being transferred. Except when two or more radar targets merge, there is one distinguishing feature that sets them apart from each other. This feature is position, geographical position. With the patented Coordinate Locator and Plotter, the position of the radar target is established and transmitted automatically to the facility next to control the aircraft. In areas where radar coverage does not exist, the point where the tape crosses or touches the geographical boundary separating the jurisdictional areas is defined by the use of the Coordinate Locator and Plotter. These values, associated with the time increment on the tape that occurs at the point of transfer are transmitted to the facility receiving the flight.

The tapes, representing individual aircraft, become the face of a clock in linear form. The time increments as provided or established by the computer correspond to the distance aircraft will fly for that time period. By transferring the plates bearing the tapes into registration with radar video, the radar targets of the aircraft represented by the tapes become the moving element of the clock. If the time increments on the tape are spaced correctly and are indexed with the radar target it represents, the clock will indicate correctly. When the ground speed is incorrectly calculated or the pilot increases or decreases speed, the target becomes disassociated with the time increment on the tape and the clock runs fast or slow as the case may be. A major objective of the system is to maintain coincidence between the calculated and actual position of aircraft under control.

Locating aircraft conflicts

Plates bearing the posted data are delivered mechanically or manually to the appropriate altitude slot of the display console storage section. As the plate is brought into registration with all other plates occupying a particular altitude slot, the data on the plates can be examined. Each point where the tape on one plate crosses the tapes on other plates, that point is a control point or potential control point. The estimated time each aircraft will utilize a point where two tapes intersect or merge is displayed at that geographical location. Should a conflict be indicated, it could be resolved immediately by adjusting the altitude of the appropriate aircraft. Note: When an aircraft changes an altitude, the plate representing the flight is transferred to the slot that corresponds to the new altitude. If the situation indicates a radar monitor of the aircraft as they use a common block of airspace, the plates of the aircraft involved are transferred below the map screen. As the plates reach registration with the radar video, their coded element activates certain controls through the computer, programming the radar beacon decoder to display only those targets the plates represent. If a radar vector is required, the aircraft vectored is restored to its course as represented by the longitudinal markings on the tape when the situation has been rectified. Any updating of the tape or the computer is made and the plates returned to storage. During the monitoring or vectoring action, the controller has the capability of projecting weather information of the area and at the altitude involved in registration with the radar targets, geography and with other environmental facilities.

Aircraft route deviations

If an aircraft deviates from its assigned route or schedule to an extent a new tape is necessary, a new plate is placed over while the old plate bearing the original posting is placed behind or below the map screen. The new tape is produced by the computer and is adjusted to the new plate with reference to the old posting in a manner that eliminates the discrepency. Action would, of course, be taken to cancel the old plate code to the computer and associate the aircraft with the new plate and its code.

If a flight has deviated from its route to an extent that a potential hazard exists, the course of the deviating aircraft can be charted to show the degree of deviation. The plate showing the filled course and the actual course flown can be transferred before the map where it is televised to the air traffic control sectors or sector for conflict resolution. If an aircraft persists in deviating from its approved route, its course flown is charted in comparison with the course filed and approved. A photographic record is made of the two courses and referred to the appropriate authority for investigation.

Calibrating navigational aids

In the interest of efficiency and economy, the appropriate authority may wish to use the system for another purpose. It is possible to use the system and using aircraft to calibrate or check the courses established by ground navigational aids. The aircraft involved would be asked to maintain "on course" of a designated signal from a station. At periodic intervals, or continuously if necessary, the position of the aircraft (radar target is recorded and plotted by the Map Coordinate Locator and Plotter). The course flown, being accurately charted is then referred to the calibrating authorities for associating the plots with the course of the navigational aid the pilot was following.

Aircraft emergencies

If an emergency landing becomes necessary while an aircraft is flying in an area under secondary radar surveillance, the pilot would simply notify the appropriate facility. The controller would transfer the plate representing the flight to the radar position. The coded element of the plate signals the computer to display only the aircraft the plate represents. A special switch is activated which connects the computer output to the appropriate element of the search and rescue organization. The controller bisects the radar target with the coordinate locator and plotter. The voltages produced by the device is fed to the computer where they are converted to position. A message is automatically transmitted to the search and rescue organization including information on aircraft identification (derived from the coded plate), the aircraft's position and time (derived from the Coordinate Locator and Plotter) and the computer's clock. This message could be expanded to include situation classification, i.e., nature and degree of emergency, type of assistance needed, etc. Each time the radar target appears upon the display, its position is established and transmitted to the agencies concerned. When the video is no longer visible on the display, the last report becomes the focal point of the search area.

If the situation occurs in the Oceanic Control Area or in areas where radar coverage is not provided, the aircraft's position (focal point of the search area) is established by bisecting the time increment on the tape with the Coordinate Locator that coincides with the time the pilot transmitted the initial message. Information relating to aircraft identification, etc., etc., is transmitted to the marine arm of the Search and Rescue Organization in a manner previously described.

Assistance to aircraft in emergencies over oceanic areas can be further expanded and facilitated by the use of information on marine shipping. Steamships, as a rule, follow definable tracks and operate at predictable speeds. This makes possible the creation of a pictorial display of marine traffic for any time period. A display would be constructed using tapes prepared by the computer, drawn in the same manner as for aircraft except that the time increments would be expressed in hours. Each tape would be placed on a common transparent plate, photographed and composed in slide form. As needed, the information is projected onto the map screen in registration with geography and the tape representing the aircraft involved. It is, with the use of the Coordinate Locator and Plotter, a simple matter to establish the course the aircraft and steamship should take to effect an interception at ditching point.

Display updating

As previously stated, pilots must state their positions and define their flight paths in terms of geographical coordinates. Where this is impractical, sufficient information must be relayed to the controller to permit the conversion to coordinates before it is inserted into the computer. Updating is accomplished as required by making simple notations on the tape for small discrepancies or replacement with a new, updated tape where major discrepancies occur. In areas of radar coverage, updating can take place at any moment by comparing or relating the position of the radar target with the time increment on the tape and with current local time. Further comparisons would then be made to determine whether the updated action produced yet other conflictions. The computer may also be used to transfer the plates before the radar position for updating purposes as frequently as deemed necessary. It is obvious now that where radar coverage exists, pilot positions are no longer required.

Displaying aircraft observing holding procedures

When it becomes necessary for aircraft to be delayed before proceeding to destination, they are normally held at some geographical location that is marked by ground navigational aids. With International's system, it is an easy matter to display aircraft holding by using a colored transparent template cut to the size of the holding airspace area as indexed with the map scale. The template is fixed to the plate at the point where the holding aircraft is flying. The pattern of the airspace area is oriented in the appropriate direction from the holding fix. As the plate bearing the holding airspace pattern are brought into registration, it becomes immediately clear whether other aircraft will transgress the area and if so, the estimated time of the transgression is clearly indicated. As the holding aircraft is lowered or raised in the holding pattern airspace area, the plate with the template intact is transferred from one slot to another, always being in the slot that corresponds to the altitude or flight level the aircraft is occupying. The controller, operating the present system must visualize the dimensions of the holding pattern airspace area and the aircraft occupying it. Further, he must visualize and determine whether or not another aircraft will transgress the space while it is being occupied.

Military missions, blocked airspace, fueling areas, etc.

Any type of military operation, irrespective of how complex, can be readily accommodated. As an example: A front type air movement occupying a 75 mile width of airspace with waves of aircraft flying at intervals within the front. Two tapes would be employed, both synchronized with each other but spaced to define the lateral boundaries of the front. The time increment on both tapes would indicate the positions of the first wave of aircraft within the front. A third tape is used directly between the first two with its time increments adjusted to represent the last wave operating within the front.

Stream type movements: This is an air movement where the mission occupies the same airspace successively or where one aircraft trails the other by a specified time or distance. In this case, two tapes are used. The first is adjusted to the plate to represent the course and first aircraft in the stream while the second tape is placed parallel to and slightly apart from the first with the time increments adjusted to correspond with the time the last aircraft in the stream operates.

Blocking areas for special type military operations

When it becomes necessary for the military authorities to have the exclusive of certain defined airspace, they are easily and quickly accommodated by taking the following action. The area in question is outlined upon the face of the map screen with a template or a china pencil. Aircraft planning or filing a flight plan through the area are given alternate routes to ensure military freedom of action. For those aircraft already airborne, their flight tracks are compared quickly with the defined area and if a transgression is indicated, new routes are assigned as appropriate.

At an early date, Air Traffic Control must have the capability for providing pilots with the position of their aircraft. This service can now be provided from the ATC standpoint but aircraft must be prepared to deal with this new dimension. There are many reasons why this is essential and many reasons why International is not prepared to discuss it further at this time.

Having defined the invention, what is claimed is:

1. An air traffic control system for controlling movements of aircraft in a given flight control area comprising,
    (a) means for receiving and transmitting flight information from an aircraft,
    (b) a computer including programming means for programming the said computer for the reception of the flight information, the said computer reading out in the form of printed transparent tape the flight plan of the aircraft in the control area,
    (c) means for receiving the said tapes including transparent coded plates to which the said tape is adhered in accordance with the direction of the aircraft within the control area, the plate coded to match the said computer relative to the given flight plan,
    (d) viewing means including a control area map for receiving the coded plates, the said area map representing the area under flight control and being in complete registry with the coded plate having the flight tape thereon,
    (e) and aircraft location means adjacent to the map and plate for plotting the location of an aircraft in the flight control area.

2. An air traffic control system for controlling movements of aircraft in a given flight control area comprising,
    (a) means for receiving and transmitting flight information from an aircraft,
    (b) a computer including programming means for programming the said computer for the reception of the flight information, the said computer reading out in the form of printed transparent tape the flight plan of the aircraft in the control area,
    (c) means for receiving the said tapes including transparent coded plates to which the said tape is adhered in accordance with the direction of the aircraft within the control area, the plate coded to match the said computer relative to the given flight plan,
    (d) viewing means including a control area map for receiving the coded plates, the said area map representing the area under flight control and being in complete registry with the coded plate having the flight tape thereon,
    (e) aircraft location means adjacent to the map and plate for plotting the location of an aircraft in the flight control area.
    (f) and radar means scanning the flight control area and projected in registry with the said coded plate and area map for resolving aircraft conflicts.

3. An air traffic control system for controlling movements of aircraft in a given flight control area comprising,
    (a) means for receiving and transmitting flight information from an aircraft,
    (b) a computer including programming means for programming the said computer for the reception of the flight information, the said computer reading out in the form of printed transparent tape the flight plan of the aircraft in the control area,
    (c) means for receiving the said tapes including transparent coded plates to which the said tape is adhered in accordance with the direction of the aircraft within the control area, the plate coded to match the said computer relative to the given flight plan, (d) viewing means including a control area map for receiving the coded plates, the said area map representing the area under flight control and being in complete registry with the coded plate having the flight tape thereon, (e) aircraft location means adjacent to the map and plate for plotting the location of an aircraft in the flight control area, (f) radar means scanning the flight control area and projected in registry with the said coded plate and area map for resolving aircraft conflicts, (g) and weather projection means for projecting weather maps of the control area in registry with the said coded plate and area map for determining area conditions in the flight control area.

No references cited.

CHESTER L. JUSTUS, *Primary Examiner.*